May 28, 1963 H. B. GRAVES 3,091,734

TRANSCEIVER CONSTRUCTION

Filed Nov. 7, 1960 4 Sheets-Sheet 1

INVENTOR.

Henry B. Graves

BY Ernest H. Schmidt

Attorney

May 28, 1963 H. B. GRAVES 3,091,734

TRANSCEIVER CONSTRUCTION

Filed Nov. 7, 1960 4 Sheets-Sheet 2

INVENTOR.
Henry B. Graves
BY
Ernest H. Schmidt
Attorney

TRANSCEIVER CONSTRUCTION

Filed Nov. 7, 1960 4 Sheets-Sheet 3

*INVENTOR.*
Henry B. Graves
*BY* Ernest H. Schmidt
Attorney

May 28, 1963 H. B. GRAVES 3,091,734

TRANSCEIVER CONSTRUCTION

Filed Nov. 7, 1960 4 Sheets-Sheet 4

INVENTOR.
Henry B. Graves
BY
Ernest H. Schmidt
Attorney

United States Patent Office 3,091,734

Patented May 28, 1963

3,091,734

TRANSCEIVER CONSTRUCTION

Henry B. Graves, Miami, Fla., assignor to Electronic Devices Corp., a corporation of Florida Filed Nov. 7, 1960, Ser. No. 67,803
3 Claims. (Cl. 325—25)

This invention relates to combination transmitter-receiver constructions, commonly called transceivers, and is directed particularly to improvements in the tuning components of the transmitter portion of such transceivers.

The principal object of the invention is to provide in a multiple-channel, fixed-frequency radio transmitter an improved method and means for tapping the power output inductor or tank coil to facilitate pre-tuning at a selected set of channel frequencies which may be controlled, for example by piezoelectric crystals, individual frequencies of which may thereafter be selected by simple switching.

A more particular object of the invention is to provide a transmitter output inductor of the character described which is in the form of a conductive spiral printed on a flat, rigid dielectric board, preferably of a reinforced synthetic plastic, which spiral is provided with electrical tap lugs located at a system of polar coordinates lying along its length enabling tapping of the inductor at a particular tap lug corresponding to the desired frequency for a particular channel in accordance with a prepared calibration chart.

Yet another object of the invention is to provide, in a multiple-channel fixed frequency radio transmitter of the character described, improved mechanism for switching the various tuned circuit components including the output inductor or tank coil, simultaneously, so that changing from one channel to another can readily be accomplished by a single switching operation.

Still another object is to provide a radio transmitter tank coil of the character described which is exceedingly rugged and compact and which is light in weight, economical in cost, easy to install and use, and stable and durable in operation.

Yet another object is to provide a radio transmitter structure of the above nature which is especially well adapted for use in commercial communication type transceivers, particularly in aircraft installations for long distance communcation, and which is well suited to modular construction techniques for combination with other circuit units of the transmitter and receiving systems for compact packaging and simplified control.

Other objects, features and advantages of the invention will be apparent from the following description when read with reference to the accompanying drawings. In the drawings, wherein like reference numbers denote corresponding parts throughout the several views.

Figures 1, 2:
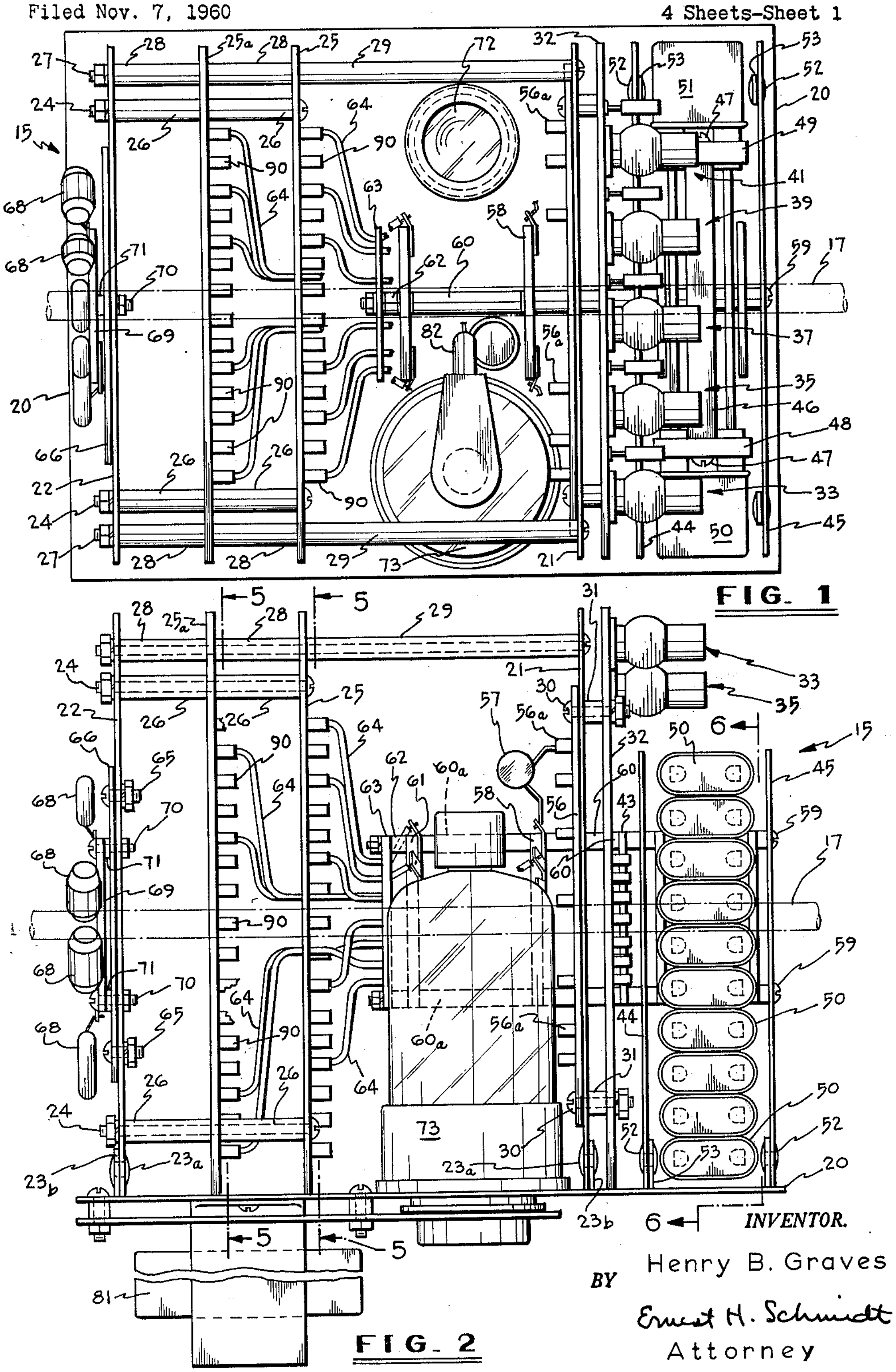
FIG. 1 is a top view of a radio transmitter structure embodying the invention.
FIG. 2 is an elevational view thereof.
Figure 5:
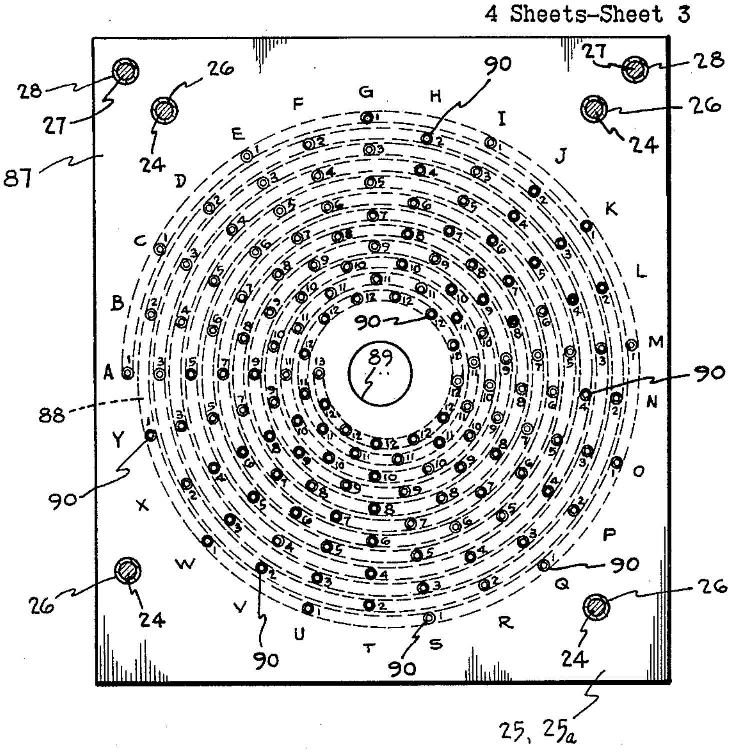
Figure 6:
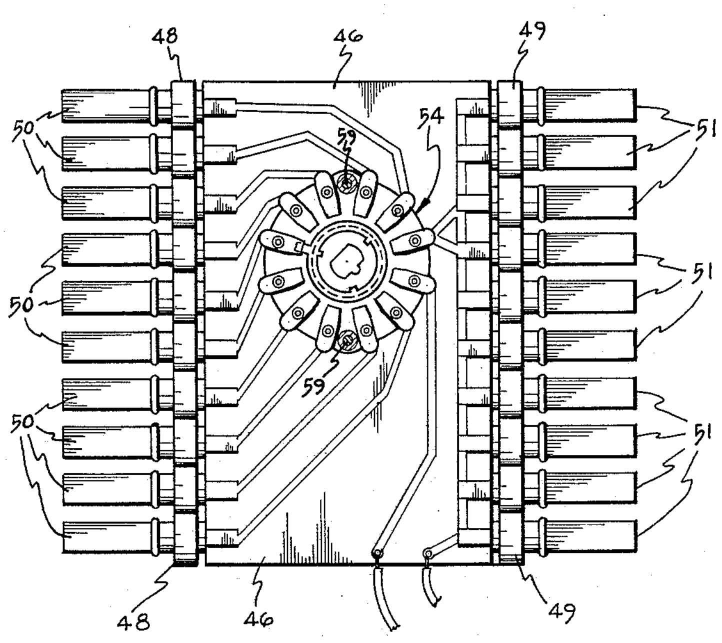
Figure 7:
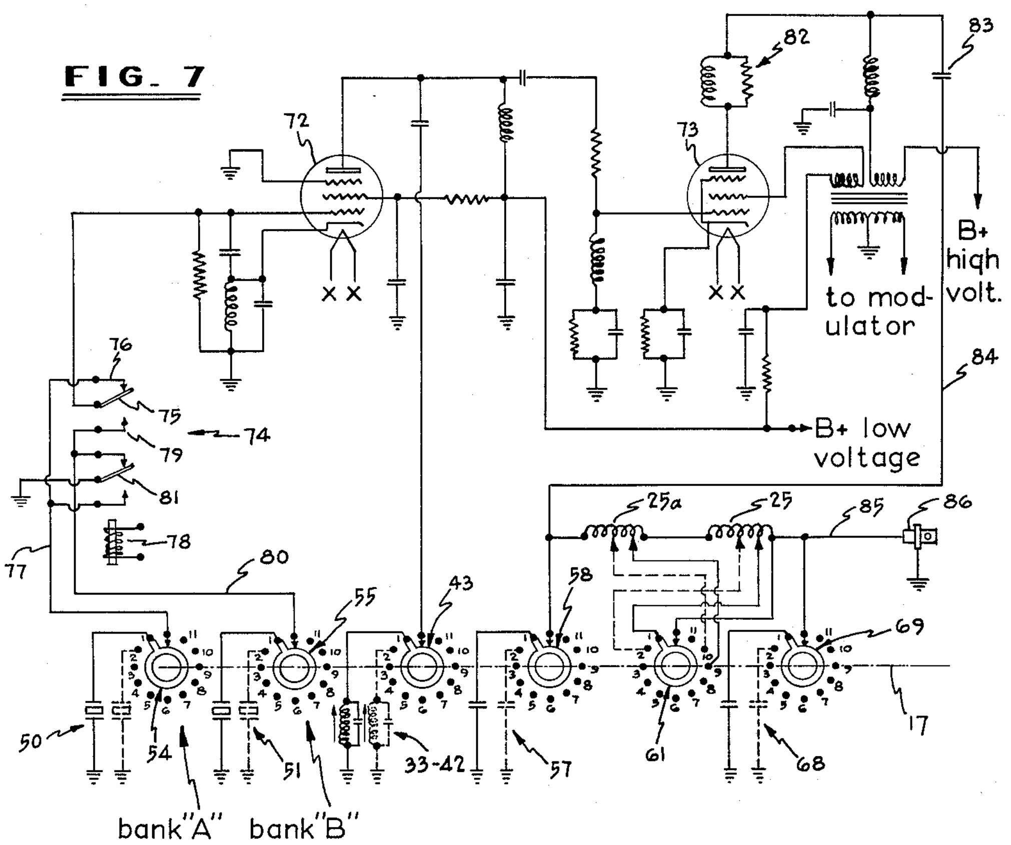
Figures 8, 9:
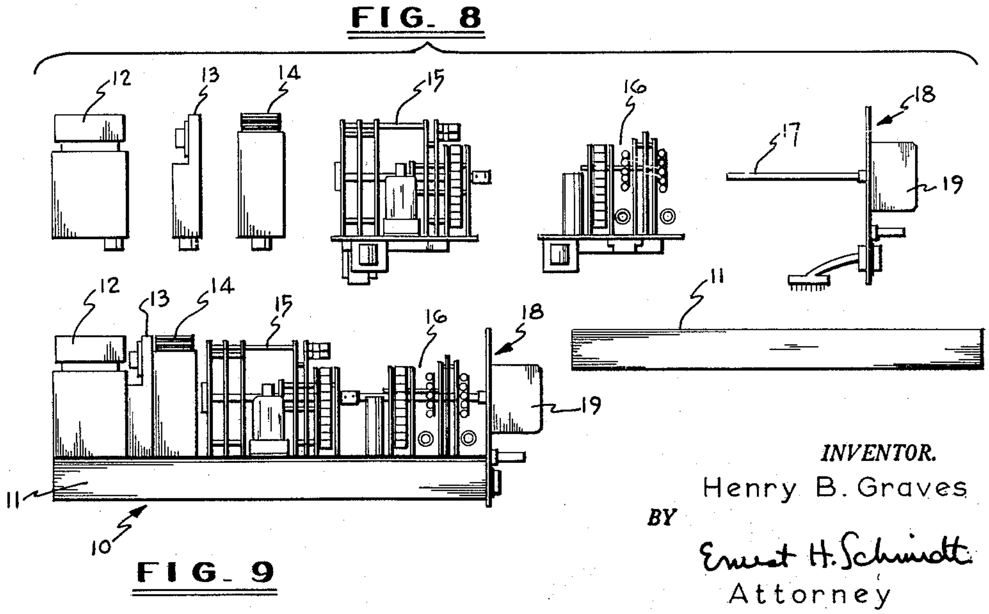

FIG. 5 is a front view of one of the spiral inductors comprising the tank coil circuit, taken along either of the lines 5—5, 5—5 in FIG. 2, FIG. 6 is a vertical cross sectional view taken along the line 6—6 of FIG. 2 in the direction of the arrows and illustrating the channel frequency controlling crystals and their rotary switching mechanism, FIG. 7 is a schematic circuit of the transmitter illustrated in FIGS. 1 through 6, FIG. 8 is a simplified exploded view illustrating how the various circuit units of the transceiver in modular form are combined on a common chassis and with a common control panel to produce an integrated transceiver, and FIG. 9 is a simplified view of the transceiver shown assembled.

Referring now in detail to the drawings, 10 in FIG. 8 designates by way of example, a transceiver embodying the invention the same comprising a common chassis 11, and modular circuit units 12, 13, 14, 15 and 16 removably secured to said chassis in any convenient fashion such as by screws or appropriate slide fasteners. The modular circuit units, 12, 13, 14, 15 and 16 comprise, respectively, the receiver output filter, output pack, the high voltage power supply, the modulator, the transmitter and the receiver units of the transceiver. As is hereinbelow more fully described, tuned circuits of the various channels for the transmitter unit 15 and receiver unit 16 are simultaneously switched from one channel to another by means of a common rotary shaft 17 running through aligned rotary switches in said transmitter and receiver units when assembled to the chassis 11. The shaft 17 extends from a front panel and control unit 18 which is secured at the front of the chassis 11 and which may be provided with an electrically actuated rotary switch 19 for changing channels remotely. It will be understood that in accordance with aircraft communication techniques, the transmitting and receiving frequencies could be either the same or different, i.e. cross frequency, for a given selected channel.

The present invention resides principally in the construction of the transmitter unit 15, particularly the output tuning inductor or tank coil system forming a part thereof which lends itself especially well to use in multiple channel communication transmitters wherein space is at a premium, wherein provision must be made for channel operating frequency changes in the field and with minimum difficulty, and wherein ruggedness, dependability and stability of operation are of utmost importance.

Referring now to FIGS. 1 through 6, which illustrate details of the transmitter unit 15, the same comprises a metal rectangular base plate 20 and a pair of front and rear upstanding rectangular metal support plates 21, 22, respectively, secured at their lower ends to said base plate as by rivets 23 fastened to upstanding lugs 23*a* struck from said base plate. Secured in spaced parallel relation between the support plates 21, 22 as by four machine screws 24 bolted to the rear plate 22 are similar flat, rectangular tank coil members 25, 25*a* hereinbelow more particularly described. The tank coil members 25, 25*a* are held in spaced relation near the rear plate 22 as by spacers 26 carried by the machine screws 24. The front support plate 21 is rigidly connected at its upper end to the rear support plate 22 and to the tank coil members 25, 25*a* by front-to-back machine screws 27 carrying spacers 28, 29.

Fixed in spaced relation in front of the front support plate 21 as by four machine screws 30 carrying spacers 31 is a rigid, flat, rectangular oscillator tuned-circuit board 32. The circuit board 32 is of a dielectric material and carries at its upper end a plurality, ten in the embodiment illustrated, parallel-connected coil-condenser combinations 33 through 42 (only six illustrated in FIGS. 1 and 2), there being one combination for each basic channel or for each pair of channel frequencies, as is hereinbelow more fully described. The coil-condenser combinations 33–42 are connected to ten individual switch contacts of a rotary wafer type switch 43 secured at a central position against the circuit board 32, the connections preferably being made by printed circuitry on the circuit board 32.

Fixed in spaced relation between a pair of spaced, parallel metal shield plates 44, 45 mounted forwardly of the circuit board 32 is rectangular crystal support member 46 of insulating material along each side of which are mounted, in a row as by screws 47 (FIG. 1) oscillator crystal sockets 48, 49. The row of sockets 48 carries a first bank of plug-in crystals 50 controlling the first group of ten operating frequencies, and the row of sockets 49 carries a second bank of plug-in crystals 51 controlling the second group of ten operating frequencies.

The shield plates 44, 45 are secured to the base plate 20 as by rivets 52 riveted to lugs 53 struck up from said base plate.

Centrally secured against the front of the crystal support member 46 is a first rotary wafer switch 54 for switching the first bank of crystals 50 (see FIG. 6). A second rotary wafer switch 55 for switching the second bank of crystals 51 is secured against the rear of crystal support member 46. Preferably, electrical connections between the terminals of the wafer switches 54, 55 and the crystal sockets 48, 49, respectively, are made by printed conductors on the crystal support member 46 (see FIG. 6).

Secured against the inside of the front metal support plate 21 by the machine screws 30 is a condenser support board 56 having terminal lugs 56*a* to support one terminal (ground terminal) of each of ten condensers 57, there being one condenser for each pair of channel frequencies. The other terminals of the condensers 57 are connected to one each of the ten switch terminals of a rotary wafer switch 58 supported in spaced parallel relation behind the condenser support board 56 and in axial alignment with the rotary wafer switches 43, 54 and 55 by means of screws 59 and spacers 60 and 60*a*. The condensers 57 constitute the input condensers of a Pi network power amplifier tank circuit, as will be evident from the schematic diagram of FIG. 7.

Secured in spaced parallel relation behind the input condenser rotary wafer switch 58 and in axial alignment therewith is a ten terminal tank coil tap rotary wafer switch 61, said wafer switch being secured in place on the screws 59 between the spacers 60, 60*a* and 62. Secured against the outer ends of the spacers 62 is a lead support plate 63 of insulating material through which tap leads 64 connected to the terminals of the rotary wafer switch 61 extend. The outer ends of the tap leads 64 are connected to selected tap lugs 90 depending upon the channel frequencies desired of the tank coil members 25, 25*a*, as is hereinbelow more fully described.

Secured centrally against the rear metal support plate 22 as by machine screws 65 is a rectangular condenser support board 66 of insulating material (see FIG. 4) having lugs 67 to support one terminal (ground terminal) of each of ten condensers 68, there being one condenser for each pair of channel frequencies. The other terminals of the condensers 68 are connected to one each of the ten switch terminals of a rotary wafer switch 69 supported in spaced parallel relation behind the condenser support board 66 and in axial alignment with the rotary wafer switches 43, 54, 55 and 61 by means of machine screws 70 and short spacers 71. The condensers 68 constitute the output condensers of the Pi network power amplifier tank circuit, as will be evident from the schematic diagram of FIG. 7.

The shield plates 44, 45, the rectangular crystal support member 46, the front and back metal support plates 21, 22, the tank coil members 25, 25*a*, the tuned circuit board 32 and the input and output condenser support boards 56 and 66 are all provided with central openings coaxial with the rotary wafer switches 43, 54, 55, 61 and 69 to allow passage of the common rotary shaft 17 in assembly of the transceiver which gangs the various tuned circuits in the transmitter with those of the receiver to allow simultaneous switching of both transmitter and receiver to one of 10 basic fixed frequency communication channels (see FIGS. 8 and 9).

Referring now to FIG. 7 and considering briefly the circuitry and operation of the transmitter 15, it will be noted that the transmitter comprises a pentode RF oscillator 72 and a pentode RF power amplifier 73. As illustrated in FIGS. 1 and 2, the oscillator tube 72 and power amplifier tube 73 are mounted upright on the base plate 20 between the front metal support plate 21 and the tank coil member 25. The circuit associated with the RF oscillator 72 is a conventional crystal oscillator circuit and thus will not be described in detail herein. It will be noted however that a relay controlled double-pole double-throw switch 74 is provided in the control grid circuit of the oscillator 72 to enable selective switching between the common or ring terminal of the rotary wafer switch 54 associated with crystals 50 constituting bank "A" crystals, and the common or ring terminal of the rotary wafer switch 55 associated with crystals 51 constituting bank "B" crystals. Corresponding crystals 50 and 51 of banks "A" and "B" are within 100 kilocycles of each other so that in a transceiver designed to operate for example on ten basic operating channels between 2.0 and 15.0 megacycles, it is possible to provide twenty transmitting and receiving channels. Thus as illustrated in FIG. 7, with the rotary wafer switches set for operation on basic operating channel "1" and with the movable contact 75 of the relay switch 74 normally in contact with fixed contact 76 which is connected by a conductor 77 to the ring terminal of the rotary wafer switch 54, the crystal 50 shown in full lines will be in operation. If the relay coil 78 is energized by a suitable source of current (not illustrated), movable contact switch 75 will be moved out of contact with fixed contact 76 and into contact with fixed contact 79, which is connected by a conductor 80 to the ring terminal of the rotary wafer switch 55, to place the crystal 51 shown in full lines in FIG. 7 in operation. Since the operating frequencies of the corresponding crystals for each basic channel in crystal banks "A" and "B" are within 100 kilocycles of each other, the tuned output circuits for the oscillator 72 and the power amplifier 73 will be broad enough at the transceiver operating range of between 2.0 and 15.0 megacycles to amplify either of the selected crystal frequencies with high efficiency.

Figures 3, 4:
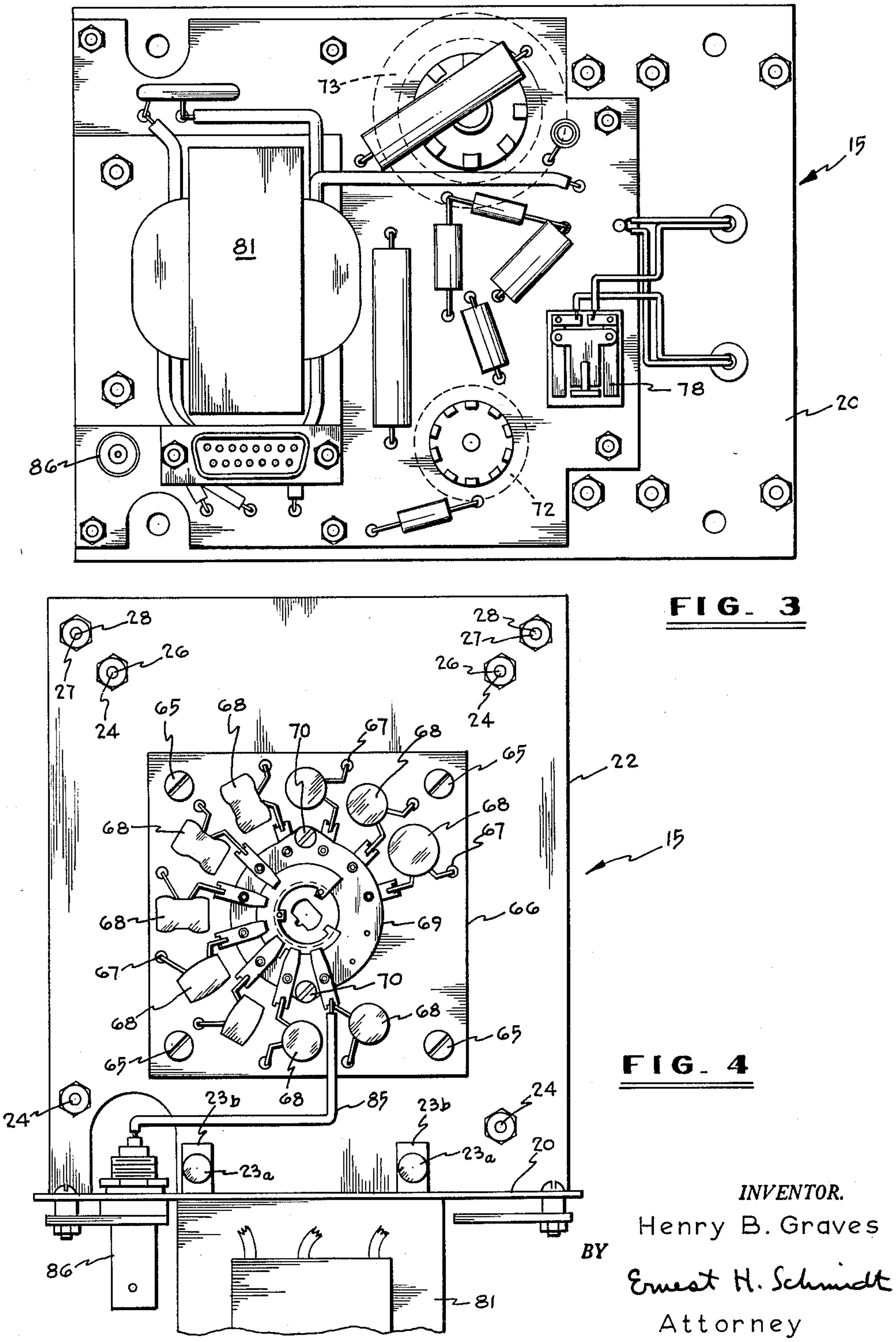
FIG. 3 is a bottom view thereof.
FIG. 4 is an end view thereof as seen from the left in FIGS. 1 and 2.

Movable contact 81 of the relay switch 74 serves to ground out the crystal of the bank of crystals opposite that bank being used, to eliminate the possibility of spurious crystal excitation. As illustrated in FIG. 3, the relay coil 78 together with its switches 74 can be conveniently located on the underside of the base plate 20.

Since the supply voltage circuits, exciter coupling circuit, bias circuits and screen modulation circuit of the power amplifier 73 are conventional, and form no part of the present invention, they are not described herein in detail. It will be noted however, that the modulation transformer 81, as illustrated in FIGS. 3 and 4, can be located conveniently against the underside of the base plate 20.

The plate electrode of the power amplifier 73 is connected through a parallel inductor-resistor parasitic suppression circuit 82 and a blocking-coupling condenser 83, to the common or ring terminal of the Pi network input condenser wafer switch 58 by a conductor 84. The conductor 84 is also connected to one terminal of the tank coil member 25*a*, the other terminal of said tank coil member being connected in series with the tank coil member 25. The remaining terminal of the tank coil member 25 is connected by conductor 85 to the common or ring terminal of the Pi network output condenser wafer switch 69 and to the RF power output jack 86 to which connection of the transmitting antenna (not illustrated) is made.

As mentioned above, tap leads 64 of the tank coil tap rotary wafer switch 61 are connected to selected taps on the tank coil members 25, 25*a* depending upon the frequency of the ten basic channels selected. As illustrated in FIG. 7, increasing portions of the coil member 25 and the entire coil 25 and increasing portions of the coil member 25a are shorted out as the switch rotary 61 is turned from channel position "1" to channel position "10," thereby incremently decreasing the inductance in the Pi power output circuit for tuning at corresponding basic channels of increasing frequency.

As illustrated in FIG. 5, each tank coil member 25, 25a comprises a flat, rectangular insulating board 87, preferably of a fiber-glass reinforced synthetic plastic, upon which is printed, by means of conventional printed-circuit technique, a multi-turn conductive spiral 88 generated about a central opening 89 in said insulating board. A plurality of tap lugs 90 extend through the board 87 and are soldered at their inner ends to the conductive spiral 88, being positioned along a system of polar coordinates enabling ease of location of any particular tap lug. Thus, as illustrated in FIG. 5, the insulating boards 87 of tank coil members 25, 25a are printed or otherwise marked on the side opposite the spiral 88 by indicia dividing said spiral into 25 segments the radial dividing lines of which are marked "A" through "Y," beginning in the first quadrant as seen in FIG. 5. Tap lugs 90 are located at alternate turns of each spiral where they intersect a radial dividing line. The tap lugs 90 along adjacent radial lines are alternately designated by odd and even numbers, consecutively increasing from the outside to the inside of the spiral. Thus any particular tap lug 90 along the spiral can be located by its polar coordinate indicia. An important feature of the invention resides in the fact that with this system of tap lug identification, calibration charts can be set up setting forth values of the input and output condensers 57, 58 respectively, and a corresponding tap lug identification for tuning the output circuit of the transmitter at the ten preselected basic frequencies without the use of elaborate electrical measuring instruments for tuning. Calibration charts designating the particular tuned circuit 34 required in the output circuit of the RF oscillator 72 are also provided for each of a plurality of crystal frequencies as may be selected for each basic channel.

While I have illustrated and described herein one form in which the invention may conveniently be embodied in practice it is to be understood that this embodiment is presented by way of example only and not in a limiting sense. In short, the invention includes all the modifications and embodiments coming within the scope and spirit of the following claims.

What I claim as new and desire to secure by Letters Patent is:

1. In a transceiver construction, the combination comprising, a multiple-channel transmitter unit, rotary switch mechanism selectively controlling the channel of transmission of said transmitter unit, a multiple-channel receiver unit, rotary switch mechanism selectively controlling the channel of reception of said receiver unit, a common chassis, means for mounting said transmitter unit and said receiver unit on said common chassis, a control unit, means for mounting said control unit on said common chassis, said rotary switch mechanisms of said transmitter and receiver units being in coaxial alignment, said control unit comprising a rotary shaft coaxial with and engaged with said rotary switch mechanisms for simultaneously controlling the channel selection of said transmitter and receiver units, said control unit comprising mechanism for stepwisely rotating said rotary shaft, an output inductor forming part of said transmitter unit and comprising a flat board of insulating material, a conductive spiral printed on one side of said board and a plurality of electrical taps conductively connected with said spiral at spaced intervals along its length, said taps being in the form of lugs extending through said board for external circuit connection at the side of said board opposite said spiral, said board having a central opening and being disposed in perpendicular relation to said rotary shaft with said shaft extending through said opening, said rotary switch mechanism controlling the channel of transmission of said transmitter comprising a plurality of switch channel selector terminals, and tap leads connected to said terminals and adapted to be connected to selected ones of said tap lugs in accordance with a predetermined transmission frequency channel desired for each step of rotation of said rotary shaft.

2. A transceiver construction as defined in claim 1 wherein said taps are arranged along radial lines extending from the axis of generation of said spiral, and wherein each of said taps is identified by indicia marked on said board.

3. A transceiver construction as defined in claim 2 wherein said indicia is in the form of printed characters along each of said radial lines, one character identifying the particular radial line, and the other character identifying the particular lug lying along the radial line, said indicia being printed on the side of said board opposite said conductive spiral.

References Cited in the file of this patent

UNITED STATES PATENTS

| | | |
|---|---|---|
| 1,342,303 | Steinberger et al. | June 1, 1920 |
| 1,837,678 | Ryder | Dec. 22, 1931 |
| 2,539,537 | Harley et al. | Jan. 30, 1951 |
| 2,789,212 | Achenbach et al. | Apr. 16, 1957 |